United States Patent [19]

Seidel

[11] 4,406,445

[45] Sep. 27, 1983

[54] HYDRAULIC TOE CLAMP

[75] Inventor: Lawrence H. Seidel, Mentor, Ohio

[73] Assignee: Jergens, Inc., Cleveland, Ohio

[21] Appl. No.: 327,217

[22] Filed: Dec. 3, 1981

[51] Int. Cl.[3] .............................................. B23Q 3/08

[52] U.S. Cl. ...................................... 269/32; 269/136; 269/137

[58] Field of Search ............... 269/137, 134, 136, 138, 269/32, 221, 282, 234, 34; 254/104; 92/129

[56] References Cited

U.S. PATENT DOCUMENTS 2,987,972 6/1961 Schneider ....................... 269/137 X

FOREIGN PATENT DOCUMENTS 593894 10/1947 United Kingdom .................. 269/34

676052 7/1952 United Kingdom ................ 269/137

*Primary Examiner*—Harold D. Whitehead

*Assistant Examiner*—Steven P. Schad

*Attorney, Agent, or Firm*—Pearne, Gordon, Sessions, McCoy, Granger & Tilberry

[57] ABSTRACT

The toe member of a low-profile toe clamp is advanced down an incline at the working end of the clamp by a pair of horizontal hydraulic pistons, one on each side of the hold-down slot of the clamp. The toe member is provided with transverse pins which are overridenly engaged by inclined faces on the pistons, so that the horizontal movement of the pistons is translated to the inclined movement of the toe member and so that a stopping action is provided by eventual engagement of the pistons with the toe member.

3 Claims, 3 Drawing Figures

HYDRAULIC TOE CLAMP

This invention relates to clamps for holding workpieces on the worktable of a machine tool such as a milling machine, planer, shaper, jig borer, drill press or the like, and particularly to low-profile toe clamps that grip downwardly and inwardly against the side of the work, thereby holding the work firmly against the worktable top and against a suitable backing member on the worktable, and leaving the top surface of the work open for machining.

Low profile toe clamps have previously been provided wherein a generally horizontal low-profile clamp body having a central hold-down slot is provided on its forward working end with an inclined slideway which keyingly receives a toe member adapted to be advanced down the slideway into clamping engagement with the work. The toe clamp is advanced by a head screw which acts in a direction parallel to the inclined slideway. A hand held wrench is used to tighten the toe member of the clamp against each workpiece. The wrench is also used to back off the screw after machining is completed.

No practical means for powered clamping and unclamping of low-profile toe clamps by a hydraulically operated linkage has heretofore appeared feasible because of the restricted space available in the slotted clamp body, particularly at the working end which has the inclined slideway with the toe member keyed thereto. The art has not heretofore succeeded in providing a practical power operated linkage within these severe space constraints. Not only must a power linkage be provided within these tight space constraints, but also within them must be provided suitable stop means to prevent the toe member being tightened down so far as to engage the worktable and cause springing or breakage or loosening of the grip on the workpiece under further applications of hydraulic pressure. Thus, use of low-profile toe clamps has generally been limited to applications where the clamping and unclamping of each workpiece is accomplished manually.

The present invention solves the problem of providing a low-profile toe clamp with a self-contained hydraulically operated linkage for powering the clamping and unclamping actions of the toe member along the inclined slideway at the working end. This is done by providing paired hydraulically interconnected pistons, one on each side of the hold-down slot of the clamp, and each engageable in overriding relation with transverse pin means positioned in piston-receiving recesses formed in opposed sideward portions by the toe member, the engagement being such that horizontal motion by the pistons is converted to inclined movement of the toe member by balanced application of forces to the two sideward portions of the toe member, and simultaneously the pistons overtake the toe member and finally engage it to provide a stop or lock. The result is a rugged and reliable hydraulically operable linkage of simple design, well suited to the restricted confines of a low-profile toe clamp.

The following description of an embodiment of the invention refers to the accompanying drawing in which FIG. 1 is a plan view of a toe clamp embodying the invention; the toe member is partly broken away and is shown in fully lowered position for simplicity of illustration, although the toe member does not reach this position in operation. The hydraulic pistons used in the invention are omitted from FIG. 1.

FIG. 2 also shows one of the hydraulic pistons.

Figure 1:
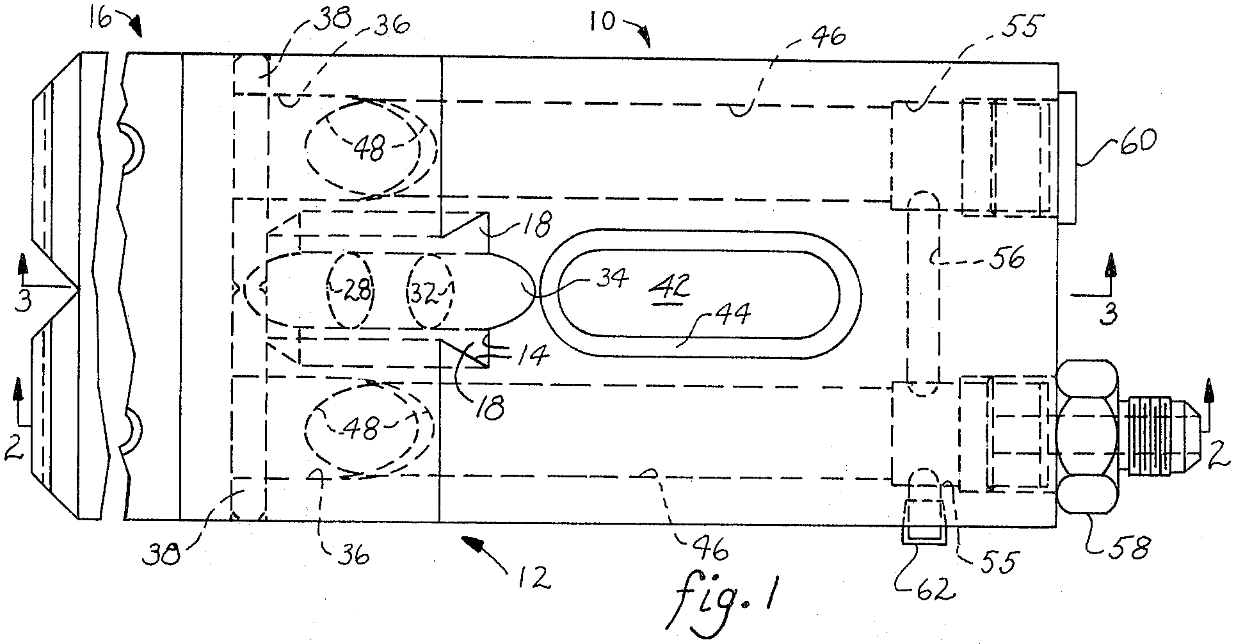

The illustrated toe clamp comprises a toe clamp body 10 having a working end 12 on which is formed a keyway or slideway 14 (FIG. 1) extending from the upper relatively rearward portion of the working end 12 to the lower relatively forward portion of the working end.

A toe member 16 is mounted on the working end. The central portion of the toe member is provided with a key 18 which is slidably keyed to the slideway 14 for movement over the working end 12 downwardly and forwardly in an advancing direction and upwardly and rearwardly in a retracting direction. Such movements, of course, each have both horizontal and vertical components. A spring 20 (FIG. 3) is positioned within a chamber 22 of circular cross section formed by groove-like semicircular depressions 24 and 26 formed respectively in the slideway 14 and the key 18. The chamber 22 is closed at one end by an end wall 28 formed by a boss-stop portion 30 of the body 10. The other end of the chamber 22 is closed by an end wall 32 formed by a boss-stop portion 34 of the toe member 16 and particularly the key 18 thereof. The reaction of the spring 20 against the boss-stop portions 30 and 34 of the body member 10 and toe member 16 urges the toe member 16 rearwardly and upwardly in the retracting direction.

Figure 2:
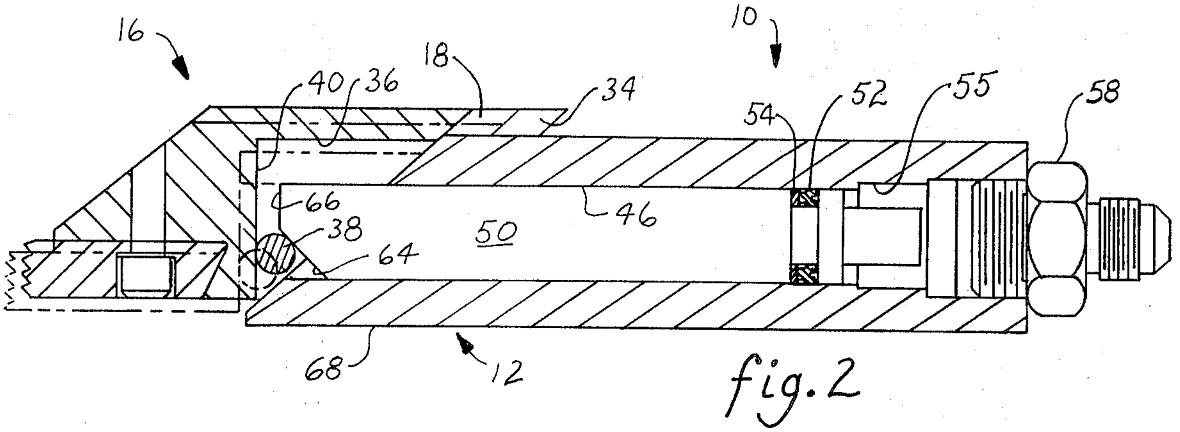
FIG. 2 is a section taken on the plane of line 2—2 in FIG. 1, but showing the toe member in raised (unclamped) and in clamped positions.

Piston-receiving recesses 36 are formed on the two sideward portions of the toe member 16. A pair of pins 38 are press fit into a transverse hole drilled across the width of the toe member 16 in intersecting relation with the lower portions of the piston-receiving recesses 36. The pins 38 accordingly extend across the recesses 36. Each pin 38 is preferably located adjacent the forward wall 40 of its associated recess 36, as seen in FIG. 2. The pins 38 have beveled ends and each may extend across half the width of the toe member 16, as shown in FIG. 1.

Figure 3:
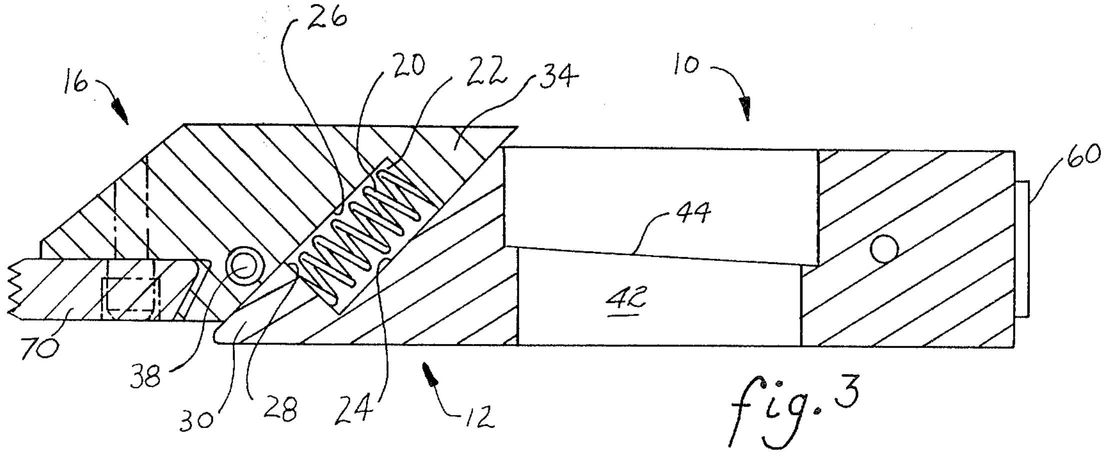
FIG. 3 is a section taken on line 3—3 of FIG. 1 but showing the toe member in raised (unclamped) position.

The body 10 includes a conventional hold-down slot 42 designed to receive a conventional socket head hold-down screw or the like (not shown) designed to be used with a T-slot nut for mounting the clamp on a machine table in a conventional manner. The lip 44 of the hold-down slot is back-tapered as seen in FIG. 3 to prevent back-off of the clamp, as is conventional.

Piston bores 46 extend along both sideward portions of the body 10 on opposite sides of the hold-down slot 42. Each bore 46 intersects the slanting face of the body member 10 at the working end 12 at one of the intersections 48 (FIG. 1). An hydraulic piston 50 (FIG. 2) moves horizontally in each of the piston bores 46 and may be provided with suitable sealing means such as a "Parker U-Pak" sealing ring 52 provided with a "Parker Parbak" contoured back-up ring 54. The pistons 50 communicate with piston chambers 55 which are connected by a transverse passage 56, and one of which is connected by a suitable fitting 58 to a hydraulic supply line (not shown). The other chamber 55 is closed off with a plug 60. A small plug 62 closes off the drill-acess portion of the transverse passage 56.

Each of the pistons 50 extends into one of the piston-receiving recesses 36, and has a downwardly and rearwardly inclined face 64 at its forward end. Each face 64 bears in overriding relation on the upper side of one of the pins 38 within a recess 36. Introduction of hydraulic fluid under pressure via fitting 58 into one piston chamber 55 and via cross passage 56 into the other piston chamber 55 advances both pistons to urge both sideward portions of the toe member 16 to advance in a balanced manner downwardly and forwardly against the bias of the spring 20. Due to the overriding action of the faces 64 on the pins 38, the actuation by the hydraulic pressure also causes the horizontal movement of the pistons 50 to tend to overtake the horizontal component of the downward and forward movement of the toe member 16. When the hydraulic pressure is relieved, the engagement between the pins 38 and the overriding faces 64 urges the pistons to retract as the toe member retracts under the bias of the spring 20.

The proportion of the parts is such that the extreme forward end 66 of each piston 50 engages the end wall 40 of the associated piston-receiving recess 36 before any portion of the toe member 16 reaches the bottom face 68, such engagement being illustrated in phantom in FIG. 2. This represents the fully advanced position of the clamp. This engagement stops or locks the toe member from further advancing movement and insures against the springing or breakage or loosening of the grip on the workpiece which could result from hydraulically driven engagement of the toe member 16 with the surface of the work table on which the tooling is mounted.

The toe member may be provided with a hardened gripping insert 70 affixed to the toe member proper by machine screws in the manner illustrated.

As can be seen, the invention provides a rugged and reliable hydraulically operated linkage of simple design which operates in a balanced manner by exerting hydraulic forces on the two side portions of a toe member of a toe-type clamp, which includes means for a positive stop or locking action to protect against over-advance, and which is of simple design well suited to the restricted confines of a low-profile toe clamp.

Although a presently preferred embodiment of this invention has been shown and described, it should be under stood that various modifications and rearrangements of the parts may be resorted to without departing from the scope of the invention as disclosed and claimed herein.

What is claimed is:

1. A toe clamp comprising a generally horizontal body member having a working end, a declining central slideway extending from an upper relatively rearward portion of said working end to a lower relatively forward portion of said working end, a toe member on said working end and having a central portion slidably keyed to said slideway for movement over said working end downwardly and forwardly in an advancing direction and upwardly and rearwardly in a retracting direction, said movements each having both horizontal and vertical components, spring means between said members and urging said toe member in said retracting direction, said toe member further having first and second sideward portions each on its own side of said central portion and each defining its own piston-receiving recess in said toe member, pin means extending across each of said piston-receiving recesses from side to side thereof, said body member having first and second sideward portions corresponding to said first and second sideward portions of said toe member and each defining its own hydraulic piston bore opening into a corresponding one of said piston-receiving recesses of the toe member, a horizontally movable hydraulic piston in each of said piston bores and extending into one of said recesses, a downwardly and rearwardly inclined face at the forward end of each of said hydraulic pistons, each said face bearing in overriding relationship on an upper side of said pin means within the corresponding piston-receiving recess to urge both sideward portions of said toe member to advance in a balanced manner downwardly and forwardly against the bias of said spring means and to cause the horizontal movement of said pistons to tend to overtake said horizontal component of said downward and forward movement when said hydraulic pistons are advanced by hydraulic pressure, and to urge said hydraulic pistons to retract as said toe member retracts under the bias of said spring means when said hydraulic pressure is relieved, the vertical clearance between the tops of said piston-receiving recesses and said pistons in the retracted position of said pistons and said toe member being sufficient to accommodate said vertical component of said downward and forward movement as said hydraulic pistons advance to fully extended position.

2. A toe clamp as defined in claim 1, said piston bores in said first and second sideward portions of said body member extending along opposite sides of a hold-down slot extending lengthwise of the body member and opening between the top and bottom faces of the body member.

3. A toe clamp as defined in claims 1 or 2, said piston-receiving recesses each having a vertical interior end wall moving with and as part of said toe member, said pistons each being proportioned to engage the end wall of its associated recess to limit said overtaking movement and stop or lock the toe member from further advancing movement at a point above the bottom face of the body member.

* * * * *